United States Patent [19]

Beatty

[11] 4,049,941

[45] Sept. 20, 1977

[54] METHOD OF REPAIRING WELDED PIPE SECTIONS

[75] Inventor: Bennie V. Beatty, Houston, Tex.

[73] Assignee: Lillie Evelyn Beatty, Houston, Tex.

[21] Appl. No.: 676,986

[22] Filed: Apr. 14, 1976

[51] Int. Cl.² ............................................. B23K 9/02
[52] U.S. Cl. .................................. 219/61; 29/401 R; 29/401 E; 29/402; 138/97; 219/137 R; 285/15; 285/286
[58] Field of Search ................. 219/136, 60 R, 137 R, 219/61; 29/401 R, 401 E, 402; 138/97, 98; 285/15, 286

[56] References Cited

U.S. PATENT DOCUMENTS

| | | | |
|---|---|---|---|
| 2,257,335 | 9/1941 | Evans | 29/401 |
| 2,420,139 | 5/1947 | Kelly | 285/15 |
| 3,606,913 | 9/1971 | Yie | 138/97 |

*Primary Examiner*—E. A. Goldberg
*Attorney, Agent, or Firm*—Robert W. B. Dickerson

[57] ABSTRACT

Welding connector comprising a housing, means for accommodating an electrode, an insulating cone for fitting within a conical passage, and magnetic means for securely fitting such cone to such passage. Method of passing electrical current from outside a metal pipe to inside thereof.

4 Claims, 8 Drawing Figures

METHOD OF REPAIRING WELDED PIPE SECTIONS

BACKGROUND OF THE INVENTION

In the laying and assembly of great lengths of pipe, adjacent sections must be joined in a substantially leakproof manner, such as by welding. Oftentimes, the solution is the creator of its own set of problems. In this instance, defects often develop in the welds, such as in the girth welds joining adjacent sections. Presently, in order to repair or replace such defects, entire strings of pipe are often removed from their bed, the necessary repairs or replacements performed, and then the repaired or substituted material returned and welded in place. It obviously is desirable to be able to make a welding repair in place. The solution to this problem is the prime purpose of this invention.

SUMMARY OF THE INVENTION

This invention provides the means by which large diameter pipe may have internal welding repairs performed, without cutting and removing sections therefrom. A source of electrical current, such as is necessary to operate a welding device, is positioned outside the pipe, in the vicinity of the defective annular weld. A welding cable is linked to a connector housing. Adjacent such housing, a ceramic cone is positioned within a conical aperture drilled through the defective weld. A tungsten electrode is then inserted through the housing and cone, to extend within the pipe. An insulator is positioned atop the housing, encircling the electrode tip, and a magnetic device used to exert a pressure retaining the ceramic cone against the wall of the conical aperture. Personnel within the pipe then affix a further contact to one end of said electrode, such contact having an additional length of welding cable leading to an electrode holder, to which a further electrode or grinding apparatus may be attached. Thus, the outside current is passed to within the pipe. After proper grinding and welding repairs are performed internally, the entire connector may be removed, and necessary grinding and welding performed to fully penetrate and fill the aperture drilled to accommodate the connector.

DESCRIPTION OF A PREFERRED EMBODIMENT

Figure 1:
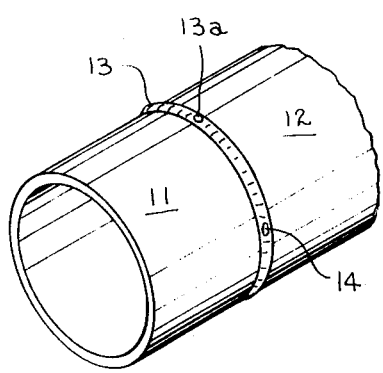
FIG. 1 is a partial perspective of a pair of welded pipe sections.
Figure 2A:
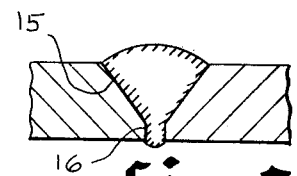
FIG. 2a is a broken elevation of an adequate weld.
Figure 2B:
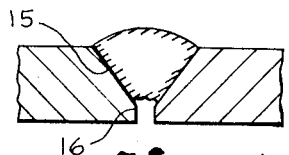
FIG. 2b is a broken section of an improper weld.

Assume that in FIG. 1, adjacent sections of pipe 11, 12 are welded together, as by girth weld 13, which girth weld is defective, as at 14. FIG. 2a indicates a generally satisfactory weld, with conical portion 15, and root 16 fully penetrated. A typical defect is exemplified by an absence of material in the root portion.

Figure 3:
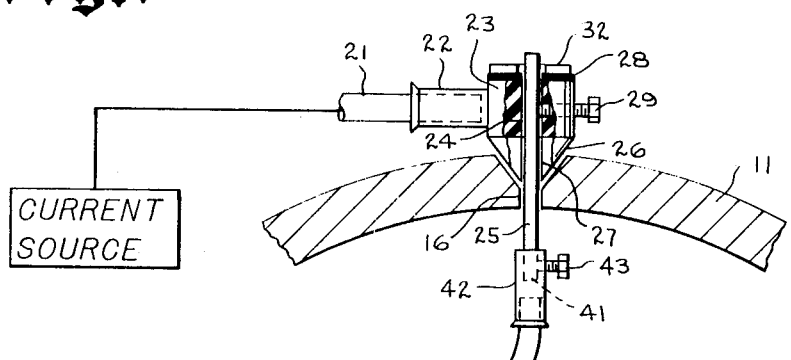
FIG. 3 is a partial section through a pipe section, with the connection assembled.
Figure 6:
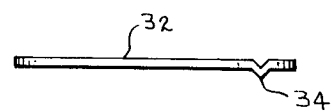
FIG. 6 is a side elevation thereof.
Figure 4:
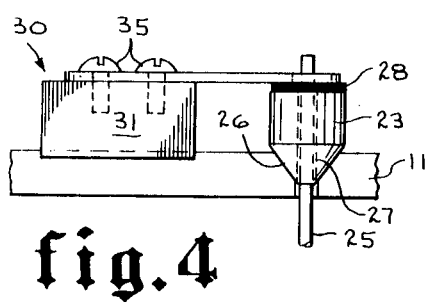
FIG. 4 is a broken side elevation of the housing and magnet assembled.
Figure 4A:
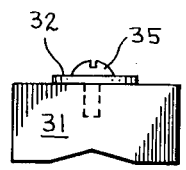
FIG. 4a is an end elevation of the magnet.
Figure 5:
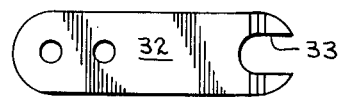
FIG. 5 is a top elevation of the spring.

This invention contemplates the provision of a source of electric current (shown schematically in FIG. 3) outside the diameter of pipe, with means for transmitting such current within the internal pipe diameter, where repairs may be performed by personnel entering therein. Such current source would be linked to this invention by cable 21. One end of cable 21 would be removably affixed to sleeve 22 extending laterally of the housing of copper contact 23. Such housing is centrally bored at 24, to accommodate a first electrode, preferably tungsten, 25. A ceramic cone 26 is positioned adjacent or fixed to the lower surface of housing 23; such cone also having a central aperture 27 therethrough to accommodate electrode 25. Centrally apertured insulator 28, preferably micarta, is placed above housing 23, with the insulator aperture in register with bore 24. Set screw 29 threadedly engages housing 23 in such a manner as to permit securing electrode 25 thereto.

A positioning member 30 comprises a magnet portion 31, which may have a slightly arcuate bottom surface (not shown) to conform to the outer surface of a section of pipe. A leaf spring 32 has a cut-out portion 33, and a transverse ridge 34, and is affixed to magnet 31 by screws 35.

Interior of the pipe sections 11, 12, the lower end 41 of electrode 25 may be removably affixed to copper contact 42 by set screw 43. Extending from one end of contact 42 is cable 44. The free end of such cable 44 may have fixed there to an electrode holder 45, or releasably connected to a grinding or other current using device.

Consider now the assembled structure of the connector, and particularly the method of using an outside current source to perform interior welding. Assume that defects in a weld, such as at 14 in FIG. 1, have been determined, either by visual examination or by x-ray. The current source would be positioned near the defect, outside the pipe. Welding personnel would enter such pipe from any suitable entry. A hole, perhaps 3/16 inch, would be drilled through the weld, such as at 13a and such hole reamed to approximately a 30° taper. At this point, electrode 25 would be inserted through housing 23 and cone 26, and fixed thereto by set screw 29. The assembly would then be positioned, with the lower end 41 of electrode 25 passing through root 16, and with ceramic cone 26 positioned against the conical walls of the tapered ream through the wall of the pipe. Insulator 28 would be placed atop housing 23 with its bore encompassing the upper end of electrode 25. Magnet 31 would be engageably positioned atop the pipe, near housing 23, with spring 32 exerting a downward force on the assembly, positively seating cone 26 within the pipe taper. Spring ridge 34 would tend to secure the spring to the insulator, and cut-out portion 33 encompass, without touching, the adjacent end of electrode 25. At this point, note a positive clearance between such electrode and the wall around root 16. Workmen within the pipe would then affix contact 42 to lower end 41 of electrode 25. Cable 44 extends from contact 42. Its free end may first be affixed to a grinding device, if desired to grind away a defective area, and then to electrode holder 45 and a further electrode to perform the necessary welding repair. Upon completion of such repair, contact 42 is disconnected from electrode 25, and such electrode, cone 26, housing 23, and the related devices removed. Thereafter, personnel outside the pipe would properly treat the tapered hole drilled to accomodate the connector, by grinding or machining in such a manner as to permit a welding operator to get 100% penetration of the root pass in the area which had been drilled and tapered.

Although only a single embodiment of this invention has been described, it should be obvious that numerous modifications would be possible by one skilled in the art, without departing from the spirit of the invention, the scope of which is intended to be limited only by the following claims.

I claim:

1. A method of repairing welded pipe sections including passing current from outside welded sections of pipe to inside thereof, comprising the steps of:
   a. perforating the weld linking said sections;
   b. enlarging the perforation to a generally conically tapered configuration.
   c. connecting a current source to one end of an electrode;
   d. passing said electrode at least partially through said perforation; and
   e. electrically connecting the other end of said electrode to current utilizing means.

2. The method of claim 1 and including the further step of insulating said electrode from the walls of said weld perforation.

3. The method of claim 2 and including the following;
   a. releasing the connection between said other end of said electrode and said current utilizing means, and
   b. withdrawing said electrode through said aperture;

4. The method of claim 3 and including the further step of sealably welding said perforation.

* * * * *